(12) United States Patent
Helvaci et al.

(10) Patent No.: US 9,188,018 B2
(45) Date of Patent: Nov. 17, 2015

(54) FLAP SEAL AND SEALING APPARATUS

(75) Inventors: Caner H. Helvaci, Derby (GB); Glenn R. Paxton, Derby (GB)

(73) Assignee: ROLLS-ROYCE PLC, London (GB)

( * ) Notice: Subject to any disclaimer, the term of this patent is extended or adjusted under 35 U.S.C. 154(b) by 754 days.

(21) Appl. No.: 13/551,991

(22) Filed: Jul. 18, 2012

(65) Prior Publication Data

US 2013/0028717 A1    Jan. 31, 2013

(30) Foreign Application Priority Data

Jul. 29, 2011    (GB) .................................. 1113054.9

(51) Int. Cl.
*F01D 11/00*    (2006.01)
(52) U.S. Cl.
CPC .......... *F01D 11/005* (2013.01); *F05D 2240/57* (2013.01)
(58) Field of Classification Search
CPC ..... F01D 5/3015; F01D 5/3007; F01D 5/326; F01D 11/00; F01D 11/005; F01D 11/006; F05D 2240/55; F05D 2240/57; F05D 2240/59; F16J 15/022; F16J 15/54
USPC .......... 277/644, 632, 650, 654; 415/134, 135, 415/136, 138, 139, 214.1
See application file for complete search history.

(56) References Cited

U.S. PATENT DOCUMENTS 4,529,355 A * 7/1985 Wilkinson ................. 415/173.1
6,142,483 A * 11/2000 Bryant, III .................... 277/598

FOREIGN PATENT DOCUMENTS

GB    2 043 796 A    10/1980
GB    2 410 984 A    8/2005

OTHER PUBLICATIONS

Nov. 22, 2011 British Search Report issued in Application No. GB1113054.9.

* cited by examiner

*Primary Examiner* — Dwayne J White
*Assistant Examiner* — William Grigos
(74) *Attorney, Agent, or Firm* — Oliff PLC

(57) ABSTRACT

A sealing plate for sealing a gap between two primary sealing plates is provided. The sealing plate has a sealing portion and a connector portion, wherein the sealing portion has a width which is greater than a width of the connector portion. An apparatus for sealing a gap between two structural components of a turbine, the apparatus including a plurality of primary sealing components, and at least one sealing plate is also provided, as is a turbine having a plurality of structural components with a gap between said structural components, wherein the gap is sealed by a plurality of sealing components, the sealing components comprising a plurality of primary sealing components and at least one sealing plate.

11 Claims, 8 Drawing Sheets

FLAP SEAL AND SEALING APPARATUS

FIELD OF THE INVENTION

The present invention relates to flap seals or sealing plates which are preferably, but not exclusively, used for sealing gaps between components in a turbine and a sealing apparatus including such flap seals.

BACKGROUND OF THE INVENTION

With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle1 23.

The gas turbine engine 10 works in a conventional manner so that air entering the intake 11 is accelerated by the fan 12 to produce two air flows: a first air flow A into the intermediate pressure compressor 14 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Leakage in gas turbines is a significant source of inefficiency and flap seals are regularly used to provide a fluid seal between adjacent components of the turbine wall. FIG. 2 shows the use of a single primary plate or flap seal 1 to provide a fluid seal between adjacent components 2, 4. However a single plate arrangement such as that shown in FIG. 2 results in gaps 3 needing to be left between the plates 1 to allow for movement and/or thermal expansion. These gaps can result in significant leakage.

A known way of overcoming this leakage is shown in FIG. 3, and uses overlap plates 5 (secondary plates) which cover the gaps between the primary plates 1. Often springs are used in conjunction with this type of seal in order to load the primary plate 1 against the adjacent components 2 and 4.

Generally, it is desirable for the seal contact faces of the primary plates 1 on the adjacent components 2 and 4 to be axially aligned so that the flap seal is vertical when in its working position. However, inherent build tolerances and differing thermal expansions mean that this objective is rarely achieved in all design conditions and a crescent shaped leakage gap arises as shown in FIG. 4 which shows a cross-sectional and isometric view of a seal created by a primary plate 1 between adjacent components 2, 4 between which an axial misalignment 52 has resulted. As shown in FIG. 4, crescent shaped gaps 51 arise at the centre of the primary plate 1 due to this misalignment. In many situations this gap is forced shut by the momentum and pressure effects of the gas in the turbine. In other arrangements closure of this gap may be assisted by a mechanical spring.

For the primary plate 1, the force required to load the plate into a sealed position (and thereby close the crescent shaped gap) can be sufficient even when there is a low pressure differential across the seal due to the relatively large surface area of the primary plate. Similarly the relative length of the primary plate means that the force required to close any crescent shaped gap in the vicinity of the primary plate using a mechanical spring is also relatively low. However, by design, the overlap plate 5 typically spans a much shorter length and seals over a gap of much smaller area. This potentially results in a situation in which neither the overpressure of the gas in the turbine or the force of a mechanical spring can generate sufficient force to close any crescent shaped gap that arises in the vicinity of the overlap plate 5.

Therefore it is desirable to achieve the best possible seal when overlap plates are used as flap seals and in similar arrangements.

SUMMARY OF THE INVENTION

Accordingly, at its broadest, a first aspect of the present invention provides a sealing plate which seals a gap between other sealing components used in a turbine more effectively, preferably completely, particularly at lower pressures.

A first aspect of the present invention preferably provides a sealing plate for sealing a gap between two primary sealing plates, the sealing plate having a sealing portion and a connector portion, wherein the sealing portion has a width which is greater than a width of the connector portion.

The dimensions of the sealing portion of the sealing plate are generally determined by the expected size of the gap between the primary sealing plates which the sealing plate is required to seal. The width of this gap (i.e. the dimension of the gap in a direction perpendicular to the direction of separation of the primary sealing plates) is usually determined by the dimensions of the primary sealing plates in that direction. The sealing portion will also generally be sufficiently long to ensure that the depth of the gap (the dimension in the direction of separation of the primary sealing plates) is covered in all conditions of expansion or movement of the primary sealing plates.

By providing a sealing plate where the connector portion has a width which is less than the width of the sealing portion, the stiffness of the sealing plate, and particularly the connector portion thereof, can be reduced. The mass of the sealing plate can also be reduced. Both individually and in combination, these changes mean that the sealing performance of the sealing plate can be improved, particularly when there is a low pressure differential which is urging the sealing plate into position. Alternatively, where a spring or other biasing means is used to urge the sealing plate into position, the force required to be exerted by the spring or biasing means may be less than for a conventional sealing plate.

Preferably the width of the connector portion is less than the width of the sealing portion along the entirety of the connector portion thereby reducing the stiffness and mass of the sealing plate accordingly.

In one arrangement, the connector portion tapers from the end adjacent the sealing portion to the end distal from the sealing portion. The tapering of the connection portion in this manner reduces or avoids stress concentrations in the connection portion.

Preferably the sealing plate has two connector portions arranged either side of the sealing portion. This arrangement allows the sealing to be held in position by connection to structural components or to the two primary sealing plates either side of the gap which is being sealed. This can allow the sealing plate to be held in place over the gap and the position of the sealing plate to be controlled more accurately than if there is a single connector portion.

Where there are two connector portions, these connector portions preferably both have a width which is less than the width of the sealing portion. The two connector portions may each have further optional or preferred features of the connector portion described above, including any combination of such features.

In one arrangement, one of said connector portions has a connector that is arranged to be fixed to one of said primary sealing plates and the other of said connector portions has a connector that is arranged to be slidably engaged with the other of said primary sealing plates.

At its broadest a second aspect of the present invention provides an apparatus for sealing a gap between two structural components of a turbine which includes a plurality of primary sealing components and a sealing plate which seals the gap between those primary sealing components more effectively, preferably completely, particularly at lower pressures.

A second aspect of the present invention preferably provides an apparatus for sealing a gap between two structural components of a turbine, the apparatus including a plurality of primary sealing components and at least one sealing plate. The sealing plate is a sealing plate according to the above first aspect and may include some, all or none of the optional or preferred features of that aspect.

The apparatus according to the second aspect provides the components which, in combination, can be arranged to securely seal the gap between the structural components. Preferably the apparatus includes as many primary sealing components as are necessary to seal the entire gap between the structural components whilst allowing for sufficient movement and/or expansion of those primary sealing components and a sealing plate to seal each of the gaps between those primary sealing components.

Preferably the apparatus is arranged, in use, to seal said gap by: the primary sealing components being arranged to seal the majority of said gap with gaps being present between each pair of primary sealing components to allow for expansion or movement of said primary sealing components; and the sealing plate being arranged such that the sealing portion seals a gap between a pair of primary sealing components and the sealing plate is connected to at least one of said primary sealing components by the connector portion.

At its broadest a third aspect of the present invention provides turbine having a plurality of structural components which have a gap between them, wherein the gap is sealed by a plurality of sealing components and a biasing means which secures those components to seal the gap more effectively, preferably completely.

A third aspect of the present invention preferably provides a turbine having a plurality of structural components with a gap between said structural components, wherein the gap is sealed by a plurality of sealing components, the sealing components comprising a plurality of primary sealing components and at least one sealing plate, the sealing plate being a sealing plate according to the above first aspect, wherein: the primary sealing components seal the majority of said gap with gaps being present between each pair of primary sealing components to allow for expansion or movement of said primary sealing components; and the sealing portion of the sealing plate seals a gap between a pair of primary sealing components.

The sealing plate used in the above third aspect may include some, all or none of the optional or preferred features of the above first aspect.

In one arrangement of this aspect, the sealing plate has two connection portions, a first of said connection portions having a first connector which is fixed to one of said structural components and a second of said connection portions having a second connector which is slidably engaged with one of said structural components. The structural component(s) to which the sealing plate is connected may be the same structural component or a different structural component.

In an alternative arrangement, the sealing plate has two connection portions, each of said connection portions having a connector which is slidably engaged with one of said structural components. The connectors may be arranged such that the freedom of movement of one of the connectors with respect to the structural components is greater than the freedom of movement of the other connector.

In each of the above arrangements, the connection portions are preferably also connected to the respective primary sealing components on either side of the gap, but able to move relative to those primary sealing components to compensate for movement or thermal expansion or contraction of those components.

The connection portions are preferably connected so as to allow the sealing portion to completely cover the gap between the primary sealing components in all operational conditions of the turbine.

BRIEF DESCRIPTION OF THE DRAWINGS

Embodiments of the invention will now be described by way of example with reference to the accompanying drawings in which.

DETAILED DESCRIPTION

Figure 1:
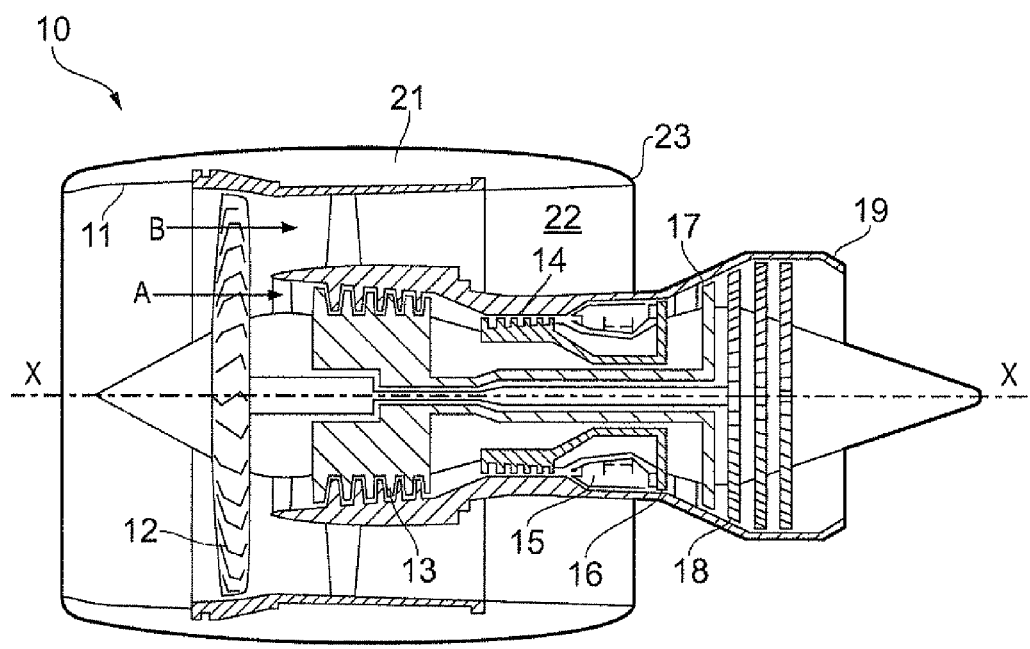
FIG. 1 shows a schematic longitudinal cross-section through a ducted fan gas turbine engine and has already been described.
Figure 2:
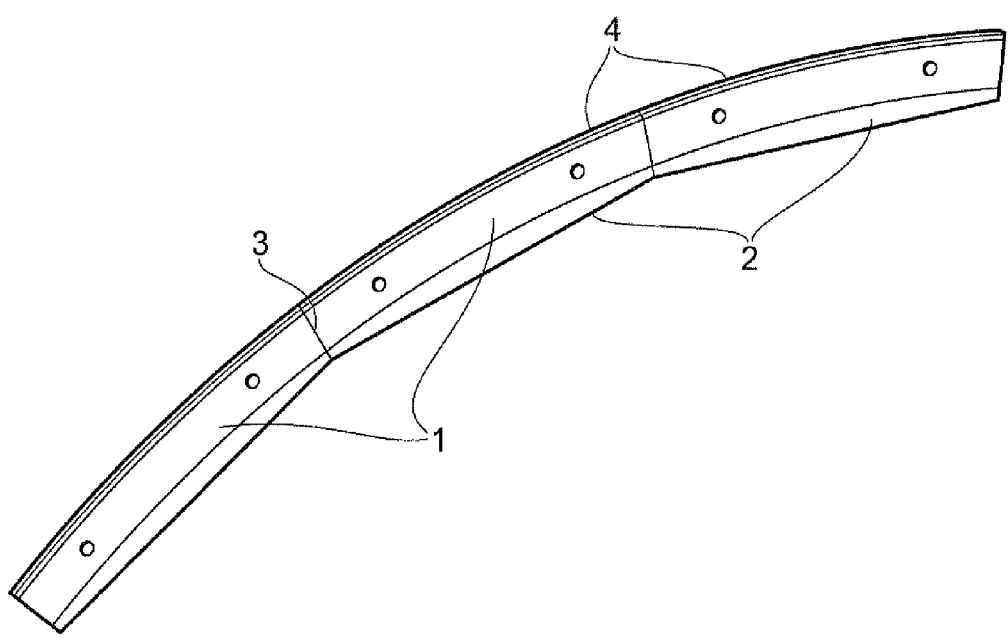
FIG. 2 shows a known rudimentary fluid seal using a plate and has already been described.
Figure 3:
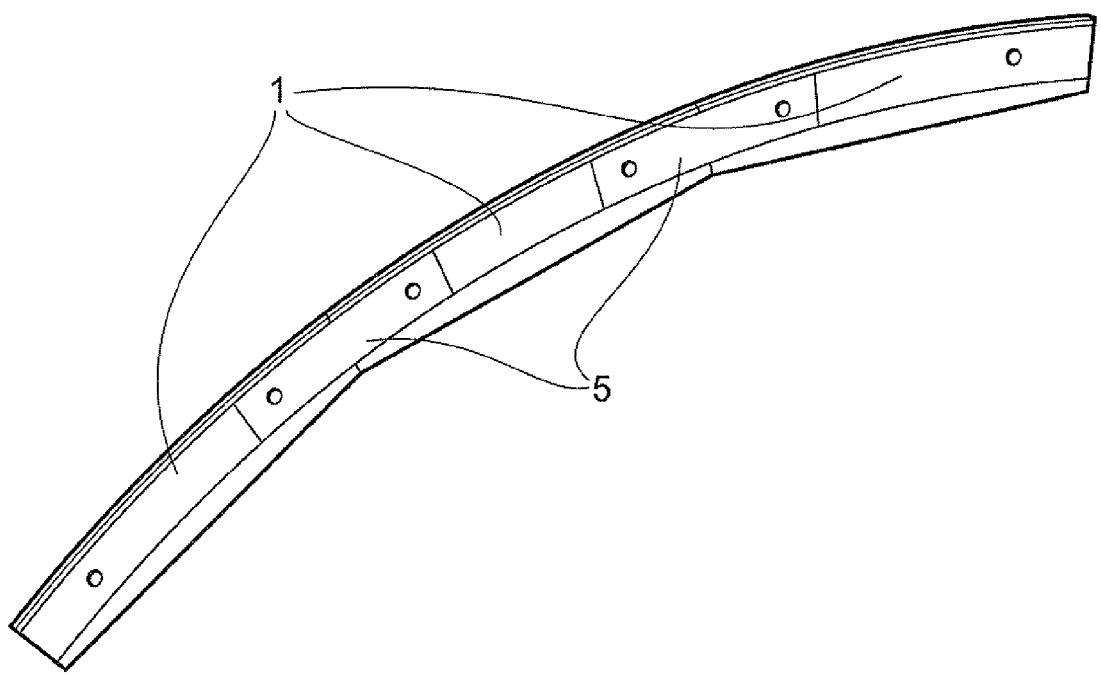
FIG. 3 shows a known development of the fluid seal shown in FIG. 2 using overlap plates and has already been described.
Figure 4:
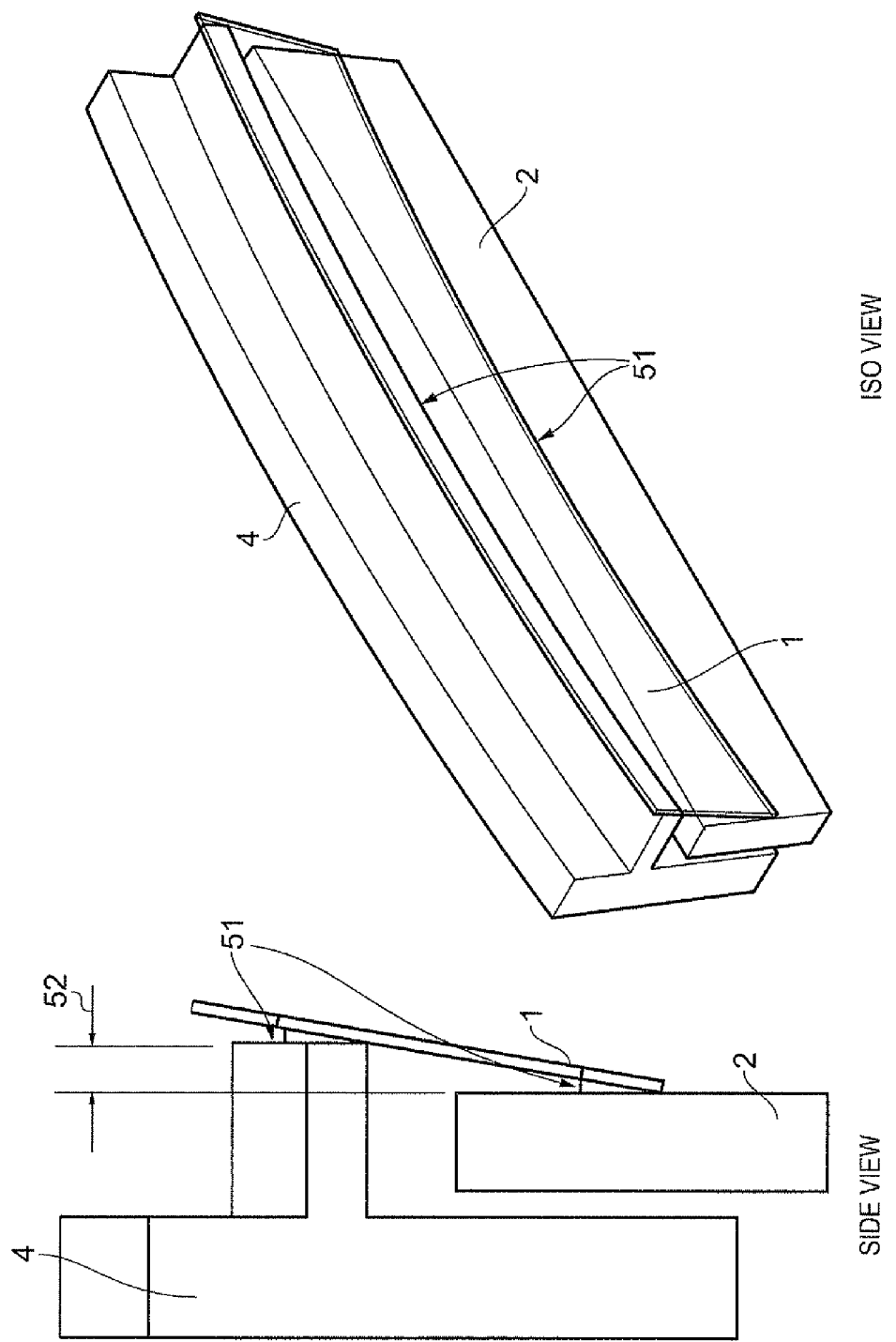
FIG. 4 shows an arrangement of an existing fluid seal and the gaps that may result from axial misalignment of the associated components and has already been described.
Figure 5:
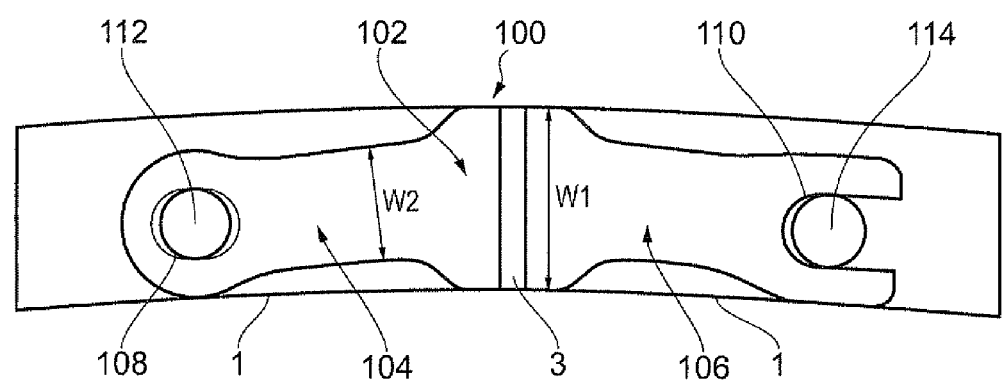
FIG. 5 shows a flap seal according to an embodiment of the present invention.

FIG. 5 shows a flap seal 100 according to an embodiment of the present invention which is a secondary or overlap plate arranged to seal the gap 3 between two primary sealing plates 1 which are respectively arranged to seal a gap between two structural components (not shown) of a gas turbine engine such as that illustrated in and described with reference to FIG. 1 above. The flap seal 100 in combination with the primary plates 1 is a sealing apparatus according to a further embodiment of the present invention.

The flap seal 100 has a central sealing portion 102 and two approximately opposing arm portions 104, 106. Each arm portion 104, 106 has a connector 108, 110 for connection of the flap seal to the primary sealing plates 1 or to the structural components of the turbine. In the embodiment shown, these connectors 108, 110 engage with pins 112, 114 which are connected to the structural components of the turbine and pass through the primary sealing plates 1.

In an alternative arrangement, one or both connectors 108, 110 may engage with a groove or slot in the pins 112, 114 which thereby restricts the movement of the seal 100 in the direction perpendicular to the plane of FIG. 5.

In a further alternative arrangement, tabs may be provided on one or both of the primary plates 1 which, together with the primary plate 1 form U-shaped slots into which the seal 100 can be inserted. These tabs may be provided instead of the pins 112, 114 thereby securing the seal 100 to the primary plates 1 rather than the structural components of the turbine.

The arm portions 104, 106 are generally of constant width w2 after tapering from the sealing portion 102. The width w2 of the arm portions is substantially less than the width in the same direction (i.e. perpendicular to the direction of separation of the primary plates between which the gap 3 that the sealing portion 102 covers exists) than the width w1 of the sealing portion. This allows the sealing portion 102 to cover the whole of the gap 3 (or to have a width w1 which is greater than the width of that gap) and thereby provide a good seal of the gap whilst reducing the stiffness and mass of the arm portions 104, 106 of the flap seal 100.

Because the flap seal 100 is covering a relatively small gap 3, the thickness of the flap seal 100 can be less than that of the primary plates 1, as it does not require the stiffness or rigidity of the primary plate to ensure that it retains its shape and sealing properties under the pressures experienced in a gas turbine. Typically primary plates 1 which are used to seal gaps between structural components of a turbine will have a thickness of 0.5 mm. The flap seal 100 of the present embodiments preferably has a thickness of 0.3 mm or 60% of the thickness of the primary plates 1.

Around the connectors 108, 110, the arm portions 104, 106 are of greater width to reduce or avoid stress concentrations arising from the presence of the connectors in the structure of the arm portions 104, 106. The connectors 108, 110 are positioned distal from the sealing portion 102, but could be at any point in the arm portions 104, 106. The greater the distance between the connectors 108, 110, the greater the flexibility and scope of movement of the sealing portion 102 which, depending on application, may be considered advantageous to maximise or minimise.

The connector 108 is an approximately circular slot which is arranged to engage with pin 112 so as to provide a limited degree of movement of the flap seal 100 relative to the pin. The connector 110 is an open ended slot which is arranged to engage with pin 114 so as to provide a significant degree of movement of the flap seal 100 relative to the pin. Together the degree of movement of the flap seal 100 relative to the pins 112, 114 allows the flap seal to move so as to accommodate movement and thermal expansion or contraction of the primary sealing plates 1 whilst keeping the sealing portion 102 covering the gap 3 between the primary sealing plates.

In an alternative arrangement, one of the connectors of the flap seal 100 may be arranged to be fixed relative to the structural component of the turbine to which it is attached.

The pins 112, 114 which are used to connect the flap seal 100 to the structural components of the turbine may also be used to connect the primary sealing components 1 to the structural components of the turbine.

The flap seal 100 is made from Haynes® 25 alloy which is a solid-solution-strengthened nickel alloy with good high-temperature strength, oxidation resistance and gaseous sufidation resistance. This material is particularly chosen for its good wear resistance and high temperature capability and materials having similar properties could also be used.

Due to the reduced width of the arm portions 104, 106 compared to the central sealing portion 102, the stiffness and mass of the flap seal 100 can be reduced compared to equivalent seals. Preferably the average width of the arm portions 104, 106 is at most 75% of the width of the sealing portion 102, more preferably at most 50% of the width of the sealing portion 102.

Figure 6:
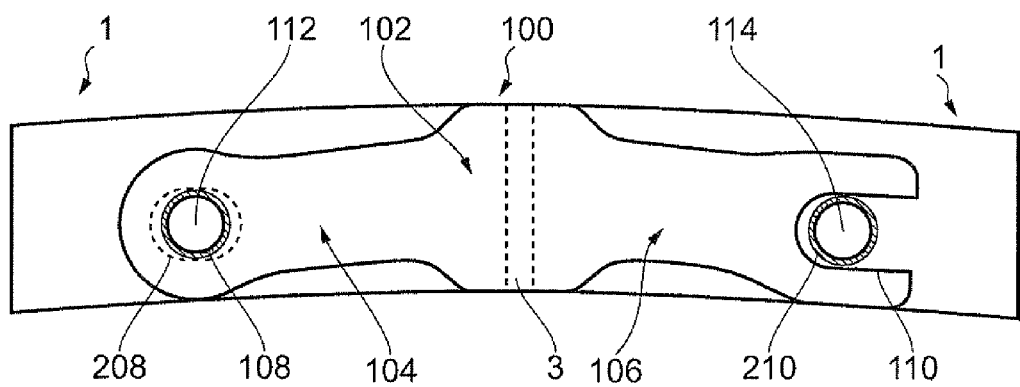
FIG. 6 shows a sealing apparatus according to an embodiment of the present invention.

FIG. 6 shows a flap seal 100 in conjunction with two primary plates 1 which form a sealing apparatus according to a further embodiment of the present invention. The same reference numerals are used for parts which are common to the seal 100 of the embodiment described in relation to FIG. 5 above.

In the apparatus shown in FIG. 6, the left hand arm 104 of the seal 100 has a connector 108 which is a hole. The corresponding connector 208 of the primary plate 1 on that side of gap 3 is arranged to engage with the same pin 112 from the structural component of the turbine. The connector 208 of the primary plate 1 has a slot configuration.

Similarly, the right hand arm 106 of the seal 100 has a connector 110 which is a slot. The corresponding connector 210 of the primary plate 1 on that side of gap 3 is arranged to engage with the same pin 114 from the structural component of the turbine. The connector 210 of the primary plate 1 has a hole configuration.

The connectors with a hole configuration allow for accurate position of the primary plate 1/flap seal 100. The connectors with the slot configuration allow for differential thermal expansion of the components.

By arranging the connectors 108, 110 of the flap seal 100 and the connectors 208, 210 of the primary plates 1 in the manner shown in FIG. 6 so that each pin 112, 114 has a connector with a hole configuration associated with it, the leakage through the gaps between the connectors and the pins 112, 114 can be reduced to the annular area formed by the clearance between the holes 108, 210 and the pins 112, 114. The effect of the larger area of the slot connectors 110, 208 is therefore negated.

Figure 7:
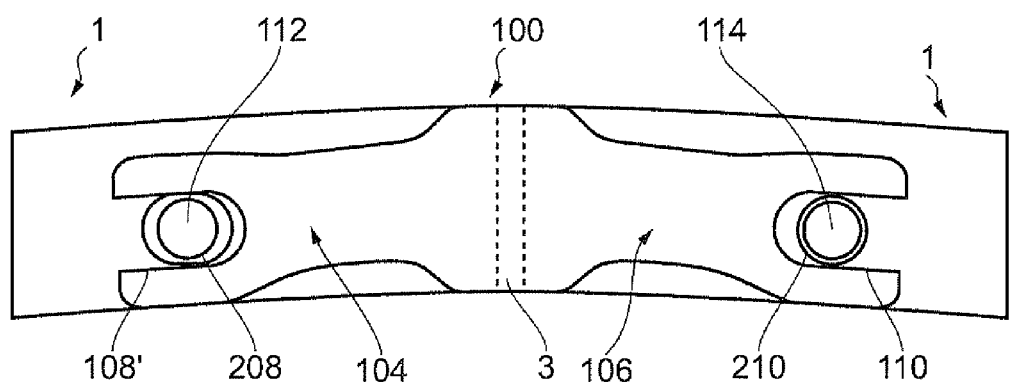
FIG. 7 shows a flap seal and sealing apparatus according to further embodiments of the present invention.

FIG. 7 shows a flap seal 100 according to a further embodiment of the present invention and which, in conjunction with two primary plates 1, forms a sealing apparatus according to a further embodiment of the present invention. The same reference numerals are used for parts which are common to the flap seal 100 and sealing apparatus of the embodiments previously described.

The connectors 108' and 110 of the flap seal 100 of this embodiment each have a slot configuration. This allows for greater ease of assembly of the sealing apparatus, but if one of the connectors 208 of the primary plate 1 also has a slot configuration, then the leakage around the pin 112 may be increased.

Figure 8:
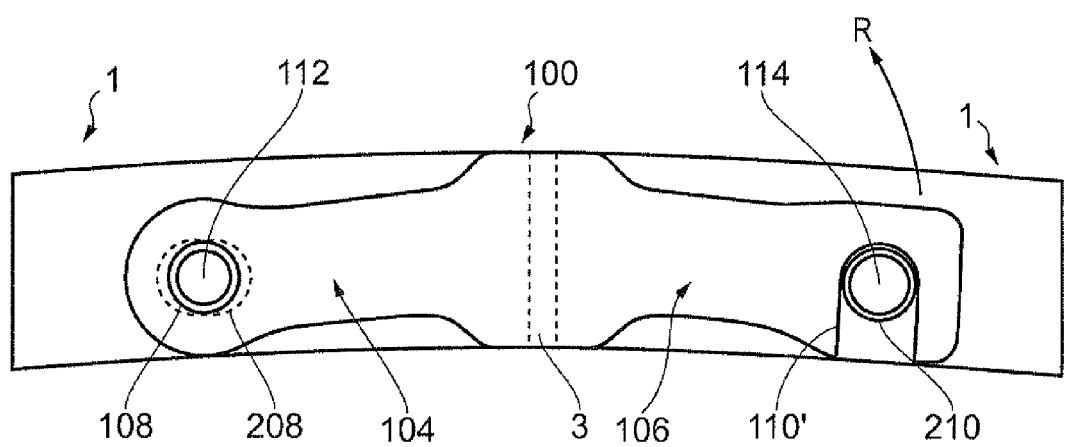
FIG. 8 shows a flap seal and sealing apparatus according to further embodiments of the present invention.

FIG. 8 shows a flap seal 100 according to a further embodiment of the present invention and which, in conjunction with two primary plates 1, forms a sealing apparatus according to a further embodiment of the present invention. The same reference numerals are used for parts which are common to the flap seal 100 and sealing apparatus of the embodiments previously described.

The connector 110' of the flap seal 100 has a slot configuration. However, whilst the slot connectors 110 shown in the embodiments of FIGS. 5-7 were generally oriented parallel to the length of the flap seal 100, the slot configuration of this connector 110' is oriented approximately perpendicular to the length of the flap seal. This connector 110' therefore allows the flap seal 100 to be rotated about pin 112 and connector 108 as shown by arrow R which allows the flap seal to be unclipped from the pin 114 (and for sealing apparatus to be assembled by attaching the flap seal 100 to the pin 112 and rotating it so that connector 110' engages with pin 114). This configuration of flap seal aids the assembly of the sealing apparatus whilst still, as shown in FIG. 8, reducing the area around the pins 112, 114 through which leakage may occur.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A sealing plate for sealing a gap between two primary sealing plates, the sealing plate comprising:
a sealing portion; and
two connector portions arranged on opposite sides of the sealing portion, the sealing portion having a width that is greater than a width of the connector portions,
wherein a first one of said two connector portions has a first connector that is arranged to be fixed to a first one of said two primary sealing plates and a second one of said two connector portions has a second connector that is arranged to be slidably engaged with a second one of said primary sealing plates.

2. A turbine comprising:
a plurality of structural components with a first gap between said structural components;
a plurality of sealing components sealing the first gap, the plurality of sealing components comprising
a plurality of primary sealing components, and
at least one sealing plate, each of the at least one sealing plate being arranged for sealing a second gap between a pair of the plurality of primary sealing components, the at least one sealing plate having a sealing portion and a connection portion, wherein:
the sealing portion has a width that is greater than a width of the connection portion;
the plurality of primary sealing components seal a majority of the first gap, with the second gap being present between each pair of the plurality of primary sealing components to allow for expansion or movement of said plurality of primary sealing components; and
the sealing portion of the sealing plate seals the second gap between the pair of the plurality of primary sealing components.

3. The turbine according to claim 2 wherein the sealing plate has two connection portions, a first one of said connection portions having a first connector which is fixed to a first one of said plurality of structural components and a second one of said connection portions having a second connector which is slidably engaged with a second one of said plurality of structural components.

4. The turbine according to claim 2 wherein the sealing plate has two connection portions, each of said two connection portions having a connector which is slidably engaged with one of said plurality of structural components.

5. The turbine according to claim 2 wherein the connection portion of each of the at least one sealing plate is connected to one of the plurality of structural components so as to allow the sealing portion to completely cover the second gap between the pair of primary sealing components in all operational conditions of the turbine.

6. The turbine according to claim 2, wherein a width of the connection portion is less than a width of the sealing portion along an entirety of the connection portion.

7. The turbine according to claim 6, wherein the connection portion tapers from a first end adjacent the sealing portion to a second end distal from the sealing portion.

8. The turbine according to claim 2, wherein the sealing plate has two connection portions arranged on opposite sides of said sealing portion.

9. The turbine according to claim 8, wherein one of said two connection portions has a first connector that is arranged to be fixed to a first one of the pair of primary sealing components and a second one of said two connection portions has a second connector that is arranged to be slidably engaged with a second one of the pair of primary sealing components.

10. The turbine according to claim 8, wherein each of said two connection portions has a width that is less than a width of the sealing portion.

11. The turbine according to claim 8, wherein each of the two connection portions tapers from a first end of the connection portion adjacent the sealing portion to a second end distal from the sealing portion.

* * * * *